May 2, 1944.　　　　R. J. HASSETT　　　　2,347,948
VEHICLE WHEEL SPRING SUPPORT
Filed Feb. 26, 1942　　　3 Sheets-Sheet 1

Inventor
Raymond J. Hassett

By Clarence A. O'Brien
and Harvey B. Jacobson
Attorneys

May 2, 1944.  R. J. HASSETT  2,347,948
VEHICLE WHEEL SPRING SUPPORT
Filed Feb. 26, 1942  3 Sheets-Sheet 2

Inventor
Raymond J. Hassett

By Clarence A. O'Brien
and Harvey B. Jacobson
Attorneys

May 2, 1944.  R. J. HASSETT  2,347,948
VEHICLE WHEEL SPRING SUPPORT
Filed Feb. 26, 1942  3 Sheets-Sheet 3

Inventor
Raymond J. Hassett

By Clarence A. O'Brien
and Harvey B. Jacobson
Attorneys

Patented May 2, 1944

2,347,948

UNITED STATES PATENT OFFICE 2,347,948

VEHICLE WHEEL SPRING SUPPORT

Raymond J. Hassett, Spokane, Wash., assignor of forty-nine per cent to Walter N. Kemp, Parkwater, Wash.

Application February 26, 1942, Serial No. 432,523

1 Claim. (Cl. 267—20)

This invention relates to new and useful improvements in spring supporting mechanisms for vehicle wheels, the principal object being to provide a spring assembly for each vehicle wheel and wherein the force of the spring is opposite to the effective action of the wheel.

Another important object of the invention is to provide shock absorbing means for vehicle wheels wherein shock is transmitted through the medium of leverage to spring shock absorbing means.

Other objects and advantages of the invention will become apparent to the reader of the following specification.

Figure 1:
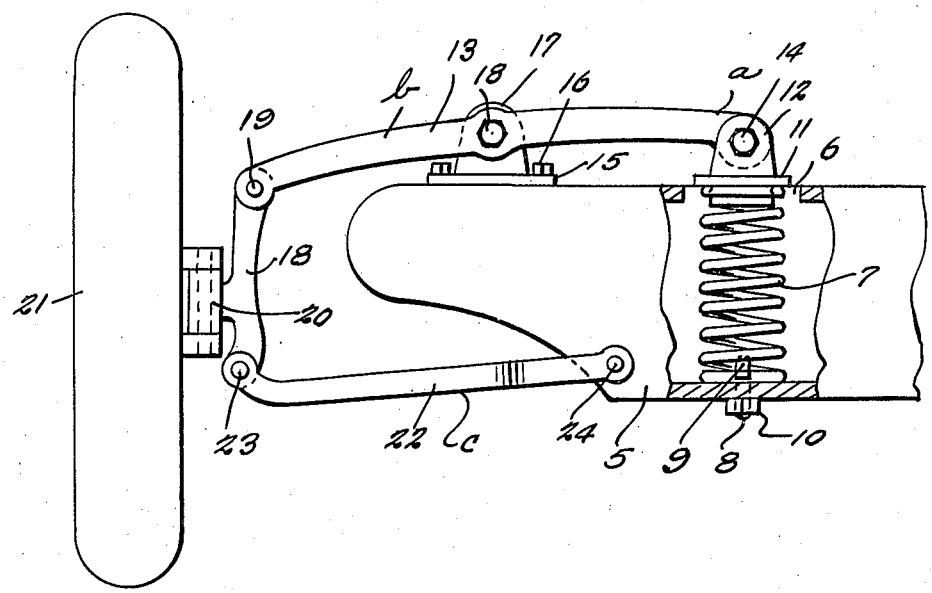
Figure 1 represents a fragmentary front elevational view showing one front wheel assembly.
Figure 2:
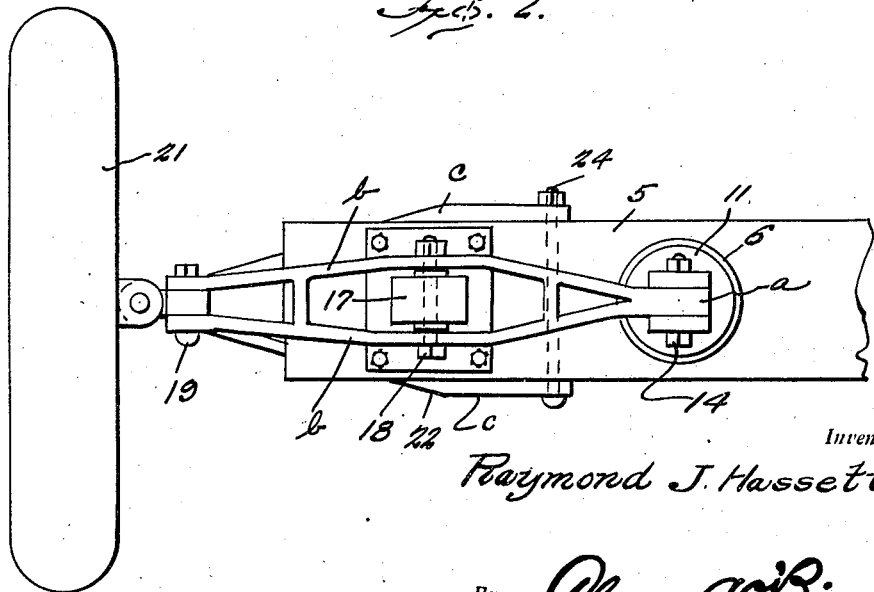
Figure 2 is a fragmentary top plan view of the structure shown in Figure 1.
Figure 3:
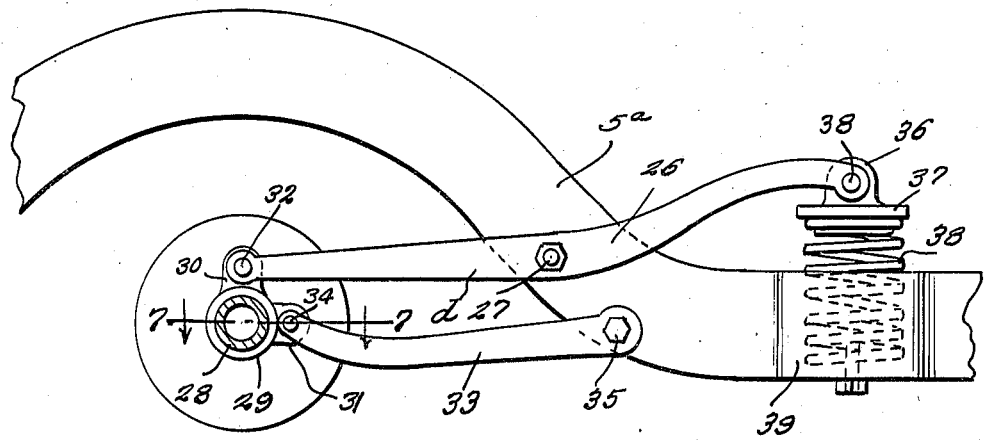
Figure 3 is a fragmentary side elevation showing a rear spring assembly.
Figure 4:
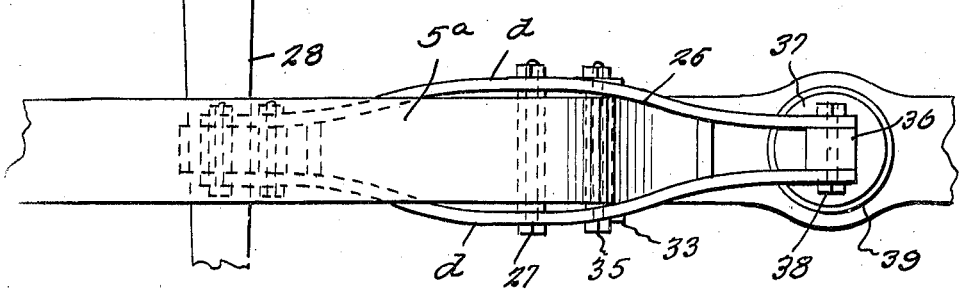
Figure 4 is a fragmentary top plan view of the structure shown in Figure 3.
Figure 5:
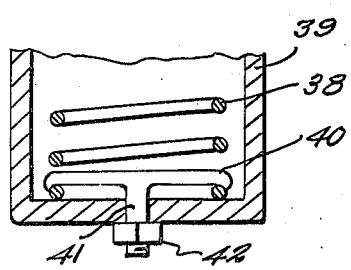
Figure 5 is a fragmentary vertical sectional view of the spring well shown in Figure 3.
Figure 6:
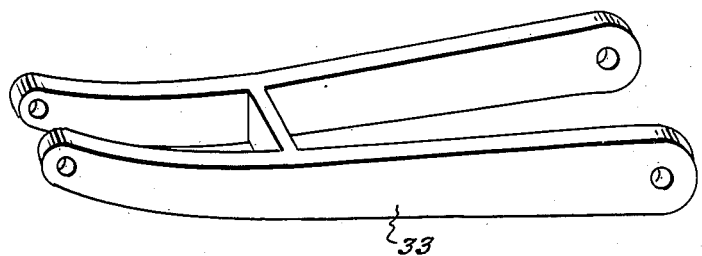
Figure 6 is a perspective view of the link structure shown in Figure 3.
Figure 7:
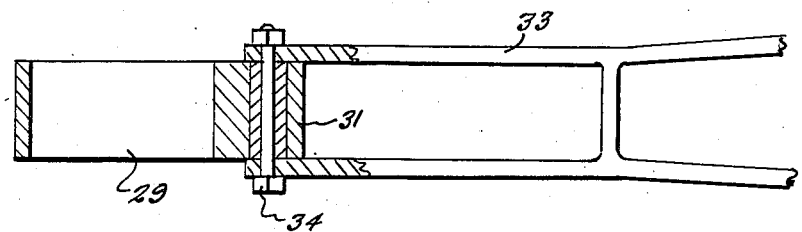
Figure 7 is a fragmentary detailed sectional view taken substantially on the line 7—7 of Figure 3.
Figure 9:
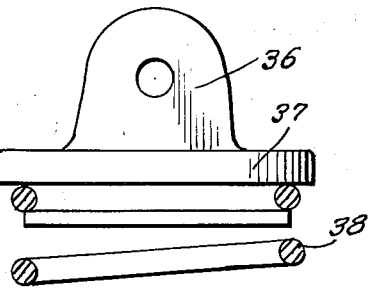
Figure 9 is a side elevation showing the spring in section of the spring and cap structure shown in Figure 3.
Figure 8:
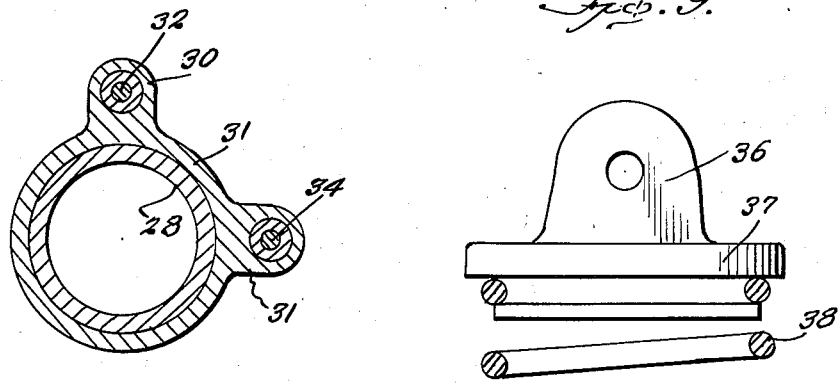
Figure 8 is a sectional view through the collar and adjacent details of the structure shown in Figure 3.

Referring to the drawings wherein like numerals designate like parts it can be seen that the front spring assembly shown in Figure 1 consists of a hollow frame structure 5 having an opening 6 in the top thereof through which the upper portion of a coiled compression spring 7 is disposed. A bolt 8 having a cross member 9 at its upper end for bridging the lower convolution of the coil 7, extends downwardly through an opening in the bottom of the frame 5 and is equipped with a nut 10. Thus the spring is held in position.

A cap 11 is provided for the upper end of the spring and this has a pair of upstanding and spaced ears 12 thereon between which the end portion a of the lever frame 13 is disposed, a bolt 14 being disposed through the ears 12 and end a of the lever frame 13 to pivotally connect the correspondingly end of the lever frame to the cap 11.

A plate 15 is secured by screws 16 to the top of the frame 5 and has a riser 17 apertured to receive a short shaft 18, the end portions of which extend through the intermediate portions of the side members b of the frame lever 13. The remaining ends of the lever 13 consist in the straddling of the side members b over a vertically disposed member 18 and being connected thereto pivotally by a pivot pin 19. This member 18 is connected by a hinge assembly 20 to one front wheel 21.

A link structure 22 having side portions c is provided for connecting the lower portion of the vertical member 18 to the frame 5. The side members c at one of their ends are pivotally connected by a pin 23 to the lower end of the vertical member 18 while the remaining ends are pivotally connected to the frame 5 by a pin 24. Obviously, any shock delivered by the wheel 21 goes through the lever 13 before reaching the spring 17.

The rear wheel mechanism is somewhat different, the rear portion of the frame being curved downwardly as at 5a and having a lever structure 26 straddling the same. The lever structure 26 is pivotally secured to the frame portion 5a by a pin 27 and includes side members d, d.

Numeral 28 denotes the rear axle on which is a collar 29 for the corresponding rear wheel and extending upwardly from this caller is an ear 30 extending rearwardly is a second ear 31. The side portions d, d straddle the ear 30 and are pivotally secured by an element 32, while a two-sided link 33 has its side members secured by a pin 34 to the ear 31. The rear ends of the side elements of the link 33 are secured pivotally by a member 35 to the portion 5a of the frame.

The rear ends of the frame members d, d of the lever 26 straddle a riser 36 on a spring cap 37 and are pivotally secured thereto by a pin 38. The lower portion of the cap 37 fits into a compression spring 38 which extends downwardly into a wall 39 in the frame portion 5a and a cross member 40 having a threaded shank 41, bridges the lower convolution of the spring 38, the shank 41 extending downwardly through the bottom of the well and being equipped with a nut 42.

While the foregoing specification sets forth the invention in specific terms, it is to be understood that numerous changes in the shape, size and material may be resorted to without departing from the spirit and scope of the invention as claimed hereinafter.

Having described the invention, what is claimed as new is:

A spring support for a wheel comprising a wheel mounting including a pair of ears, a hollow frame structure having an opening in the top thereof, a lower link comprising rigidly connected, laterally spaced side arms and straddling at opposite ends thereof said frame and one of said ears, said arms being pivotally connected to said frame and ear at said opposite ends thereof for vertical swinging movement, and an upper skeleton rocker comprising laterally spaced side arms and cross bars connecting the same, the rocker side arms being pivotally connected midway of their ends on said frame for vertical swinging movement and at one end of the rocker straddling and being pivotally connected to the other ear, and a compression spring mounted inside said hollow frame in upstanding position and projecting upwardly out of said opening, said spring being pivotally connected to the other end of said rocker.

RAYMOND J. HASSETT.